United States Patent

[11] 3,599,506

| | | |
|---|---|---|
| [72] | Inventor | Gary P. Freese<br>Will County, Ill. |
| [21] | Appl. No. | 3,791 |
| [22] | Filed | Jan. 19, 1970 |
| [45] | Patented | Aug. 17, 1971 |
| [73] | Assignee | Caperpillar Tractor Co.<br>Peoria, Ill. |

[54] CHAIN ADJUSTER WITH SELF-LOCKING MECHANISM
7 Claims, 6 Drawing Figs.

[52] U.S. Cl. .................................................. 74/242.1 FP,
  91/206, 91/217, 92/52
[51] Int. Cl. .................................................. F16h 7/12,
  F01b 15/02, F01b 7/20
[50] Field of Search.......................................... 74/242.1 R,
  242.1 TA, 242.1 FP; 92/52, 117 R; 91/206, 217

[56] References Cited
UNITED STATES PATENTS

| | | | |
|---|---|---|---|
| 1,447,242 | 3/1923 | Fritz............................. | 92/117 X |
| 1,455,841 | 5/1923 | Kelly............................ | 92/52 X |
| 2,917,277 | 12/1959 | Pine............................. | 91/206 X |
| 2,984,469 | 5/1961 | Mavity ........................ | 74/242.1 (R) X |
| 3,028,693 | 4/1962 | Malzahn....................... | 74/242.1 (R) X |
| 3,059,490 | 10/1962 | McDuffie..................... | 74/242.1 (R) |
| 3,072,219 | 1/1963 | Olson........................... | 92/52 X |

*Primary Examiner*—Leonard H. Gerin
*Attorney*—Fryer, Tjensvold, Feix, Phillips & Lempio ABSTRACT: A hydraulic adjuster assembly is provided for the endless chain of an elevator to provide a means for easily adjusting the tension in the chain. The adjuster assembly is provided with a self-locking mechanical lock means which automatically prevents the transmission of forces in the elevator to the adjuster after an adjustment has been made.

INVENTOR
GARY P. FREESE

BY
Fryer, Tjensvold, Feix, Phillips & Lempio
ATTORNEYS 3,599,506

1

CHAIN ADJUSTER WITH SELF-LOCKING MECHANISM

BACKGROUND OF THE INVENTION

This invention relates to a hydraulic adjuster assembly for adjusting the tension in an endless chain. The invention is particularly applicable to the adjustment of endless chains which are used in elevator mechanisms such, for example, as are frequently employed in elevating scrapers. It should be appreciated, however, that the invention is also applicable to other mechanical embodiments wherein the tension in an endless chain requires periodic adjustment.

Proper chain tension adjustment is required to avoid excessive tightness in the chain which results in an undue amount of horsepower being used to drive the chain due to the high internal frictional forces. Proper chain adjustment is also required to avoid excessive slack in the chain which causes the chain to separate from the chain driving mechanism and sometimes breaks the chain. Excessive slack may also permit one chain to skip sprocket teeth relative to the opposite chain so that one end of a material-carrying flight is advanced of the other end which can cause breaking of the chain. Proper chain adjustment is further required to maintain what may be called an optimal degree of sag in the chain.

With respect to the endless chain employed on the elevator of an elevating scraper, it is frequently required that the tension in the chain be adjusted, for example, every 200 hours of operation. With the known prior art chain adjusters an excessive amount of machine down time and labor is frequently required to make the adjustment.

One of the objects of the present invention is to provide a hydraulic chain adjuster which will make the adjustment of an endless chain a simple and low cost operation which can be carried out very quickly by the operator of the machine.

Another object of the invention is to provide a hydraulic chain adjuster which is operatively associated with the frame components of the machine and is equipped with self-locking mechanical locking means for automatically selectively securing the frame components to each other in order to prevent the transmission of forces to the hydraulic adjuster after an adjustment has been made.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
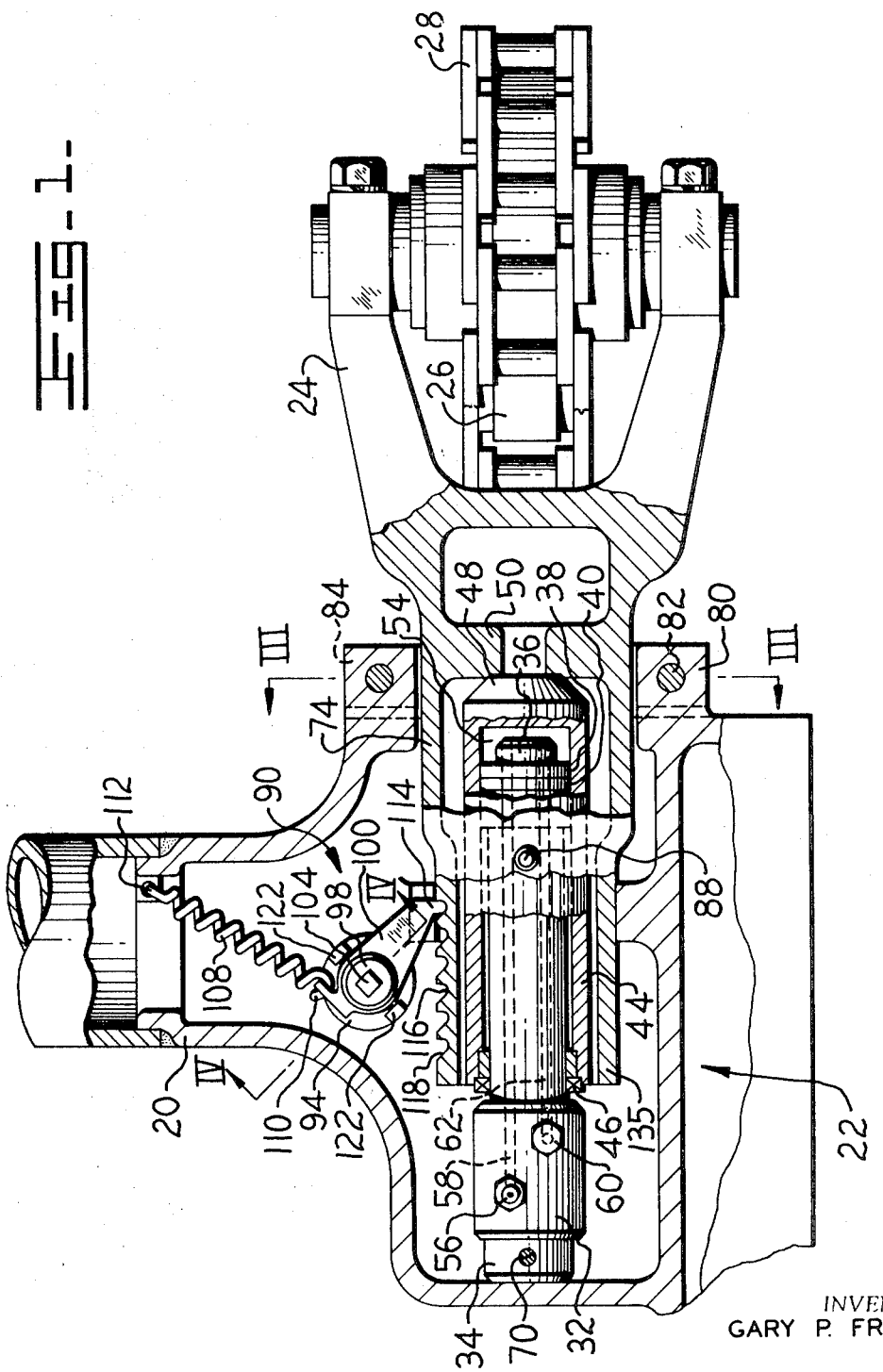
FIG. 1 is a fragmentary view, partially in section, illustrating the structural details of the chain adjuster and one embodiment of the self-locking mechanical lock means of the present invention.

FIG. 1 illustrates a cutaway portion of a hollow frame member 20 which houses the chain adjuster of the present invention. The frame member 20 of FIG. 1 takes the form of a hollow corner casting located at the corner of an elevator frame. The adjuster mechanism is shown generally at 22 and is used to extend and retract a yoke member 24. The yoke member 24 rotatably supports an idler wheel 26. An endless chain 28 is supported by the idler wheel and extends to the opposite end of the elevator frame (not shown) where the chain is drivingly engaged by a motor-driven sprocket. Thus, it will be understood that the amount of tension in the chain 28 can be adjusted by extending and retracting the yoke 24 and associated idler wheel 26.

The adjuster mechanism 22 comprises a rod member 32 which has a first end 34 suitably secured to the frame member 20. An upper end 36 of the rod 32 is provided with an annular piston shown at 38. The piston 38 is provided with annular seal elements 40.

A cylinder 44 is slidably received on the rod 32 in sealed relation thereto. Additional sealing means 46 are provided internally of the cylinder at its lower end. The upper end 48 of the cylinder 44 is engaged with an internal surface 50 formed in the yoke 24.

The upper rod end 36 having the piston 38, forms with the interior of the cylinder 44 a fluidtight variable volume chamber 54. A noncompressible fluid, such as grease, may be introduced into the chamber 54 through a conventional fitting 56 which communicates with an internal bore 58 formed in the center of the rod 32. A separate screw-type fitting 60 communicates with the chamber 54 via an internal bore 62 formed in the rod in order to relieve pressure from the chamber.

Figure 2:
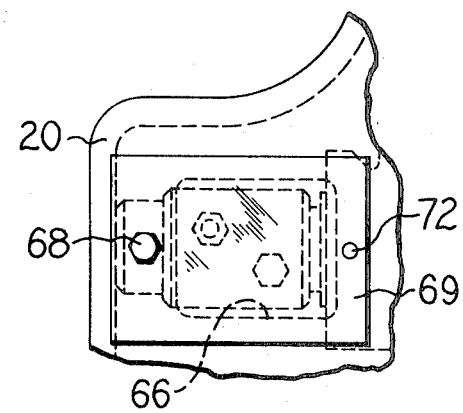
FIG. 2 is a plan view illustrating a protective cover plate which shields the fittings of the adjuster mechanism.

Referring now to FIG. 2, it will be observed that the corner casting 20 is provided with an access opening shown in dashed outline at 66. The access opening 66 is normally closed by a cover plate 69 which is secured to the corner casting by a bolt 68 which passes through the cover plate and on through bore 70 formed in the lower end 34 of the rod 32. The far end of the bolt (not shown) is then threadably received in a bore (not shown) formed in the opposite side of the frame member 20. A conventional dowel means 72 is also formed on the plate 69 to mate with a dowel opening (not shown) formed in the corner casting 20.

Thus, before an operator can achieve access to the fittings 56 and 60, the bolt 68 must be loosened by an amount sufficient to permit the plate 69 to be picked up to free the dowel 72 from its retaining hole. The plate 69 may then be pivoted about the bolt 68 thereby exposing the fittings 56 and 60.

It should be readily understood that the admission of grease through the fitting 56 will tend to force the cylinder 44 outwardly along the rod 32 which in turn will move the yoke 24 and idler wheel 26.

Figure 3:
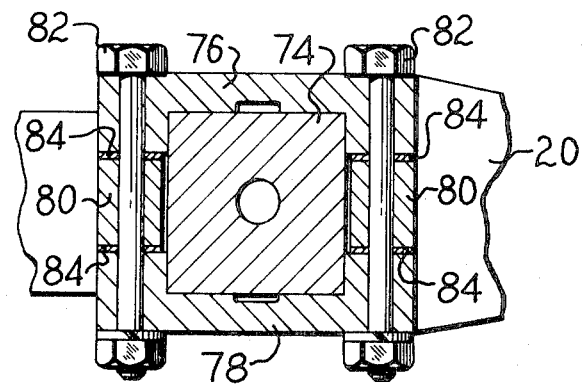
FIG. 3 is a sectional view taken on the line III-III of FIG. 1.

At this point in the description it should be noted that a central portion 74 of the yoke 24 is of a generally rectangular- or square-shaped configuration so as to prevent rotation of the yoke relative to the corner casting 20. As best shown in FIG. 3, the central portion 74 of the yoke 24 is aligned and supported by the corner casting 20 for sliding movement with respect thereto.

In FIG. 3 an upper clamp 76 and a lower clamp 78 mate with the square surfaces of the yoke 24. The upper and lower clamps 76 and 78 are retained by means of capscrews 82 on ears 80 formed on the casting 20. A snug sliding fit of the clamps 76 and 78 with the yoke 24 is maintained by inserting shims 84 between the clamps and the ears 80.

One or more dowels 88 are formed on the central portion 74 of the yoke and travel in grooves (not shown) formed in the corner casting 20. When the yoke 24 is extended to its maximum extent, the dowels 88 contact the clamps 76 and 78 thereby preventing further extension of the hydraulic cylinder. The dowels 88 also prevent the yoke 24 from sliding out of the end of the corner casting 20 when the chain 28 is completely removed from the idler wheel 26.

As has been previously mentioned, it is desirable to provide mechanical locking means for preventing the transmission of forces from the yoke 24 back to the hydraulic adjuster shown generally at 22. The present invention provides for a self-locking mechanism shown generally at 90 which functions to automatically insure that the load of the elevator carried by the yoke 24 is not transferred to the adjuster mechanism 22.

Figure 4:
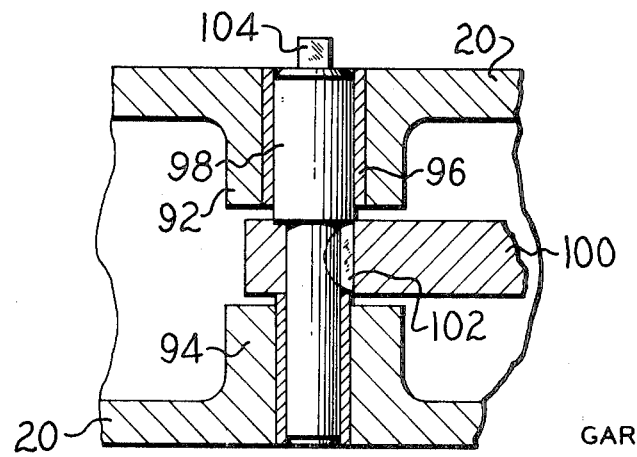
FIG. 4 is a sectional view taken on the line IV-IV of FIG. 1.

Referring now to FIG. 1 in conjunction with FIG. 4 it will be noted that the corner casting 20 is provided with a pair of internal bosses 92 and 94 having bearing elements 96 for rotatably supporting a shaft 98. A pawl 100 is connected to the central portion of the shaft 98 by means of a suitable key arrangement 102. A square tang 104 is provided at one end of the shaft 98 and projects outwardly from the surface of the casting 20 so that a wrench may be used to manually rotate the shaft and pawl 100.

A tension spring 108 has a first end 110 connected to a pawl and a second end 112 connected to the corner casting 20. The tension spring 108 tends to rotate the pawl 100 in a clockwise direction so that a finger 114 on the end of the pawl is forced into engagement with one of a plurality of grooves or notches 116 formed on the outer surface of the yoke 24. The rear portion 118 of the grooves 116 are of a ramp-shaped configuration so that as the yoke is moved outwardly from the corner casting 20, the pawl 100 is caused to pivot in a counterclockwise direction against the tenison of the spring 108.

Thus, it will be understood that as the yoke 24 is extended by the actuation of the adjuster mechanism 22 the pawl 100 will engage with successive grooves 116 thereby providing a mechanical self-locking feature which prevents the transmission of load forces from the yoke to the adjuster. In order to retract the yoke 24 and associated idler 26 the cylinder 44 of the adjuster is extended a sufficient amount to disengage the finger 114 of the pawl from one of the grooves 116. A wrench is then attached to the square tang 104 of the shaft 98 and the shaft and pawl 100 are rotated in a counterclockwise direction. This completely disengages the finger 114 of the pawl from the groove 116 and the cylinder 44 and the yoke 24 may be then be retracted.

As shown in FIG. 1, a pair of lugs 122 are formed on the boss 92 to limit the amount of rotation of the pawl 100. By limiting the amount of rotation of the pawl 100 the spring 108 cannot be stretched an excessive amount due to rotation of the shaft 98 when unlocking the self-locking mechanism 90.

Figure 5:
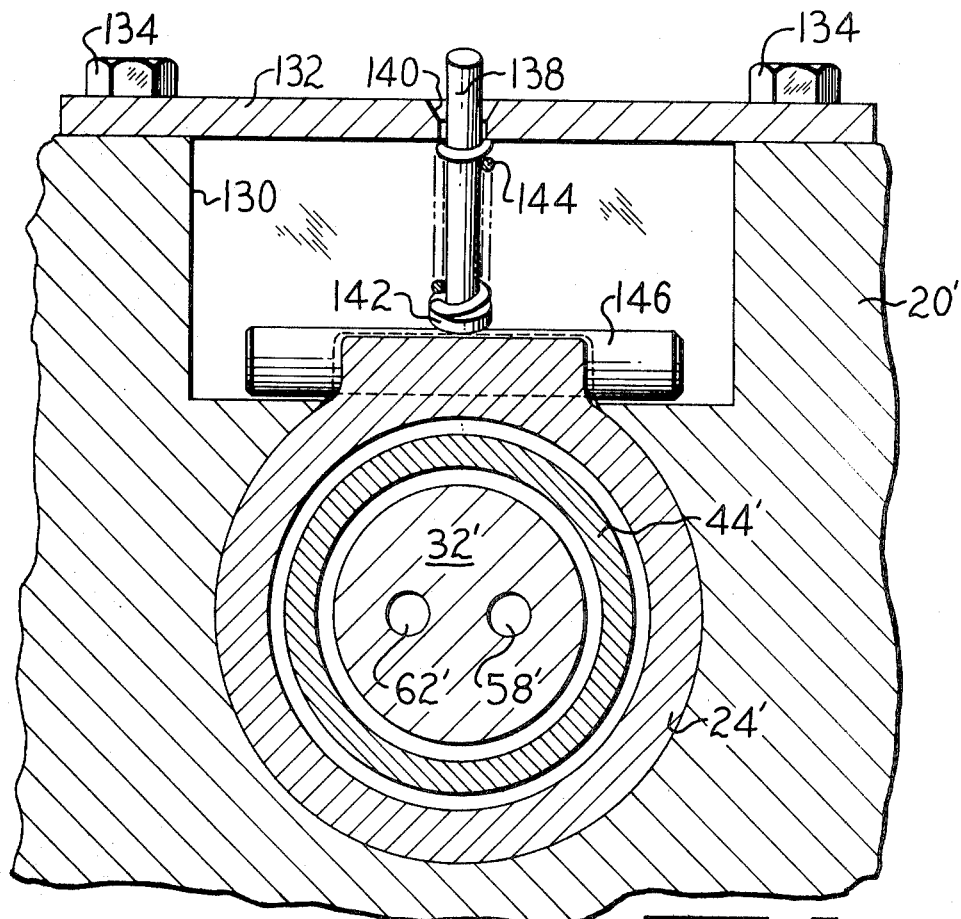
FIGS. 5 and 6 are sectional views illustrating the details of a second embodiment of a self-locking mechanical lock means.
Figure 6:
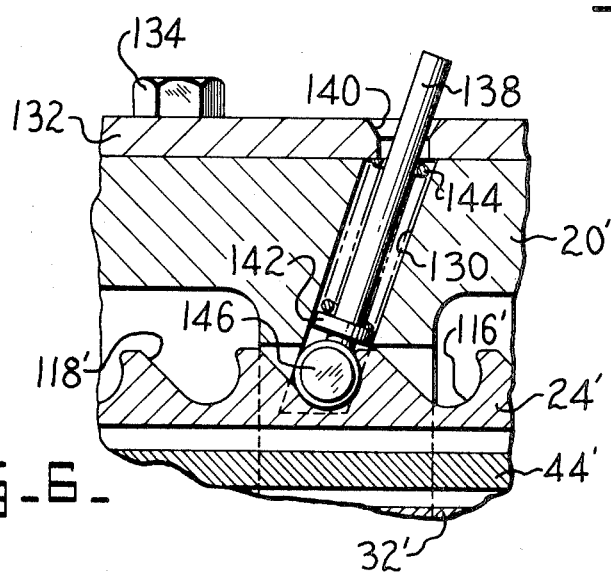

FIGS. 5 and 6 illustrate a modified embodiment of a self-locking mechanism which may be used to prevent the transmission of forces from the yoke 24 to the adjuster mechanism 22. In FIGS. 5 and 6 those elements which are identical to the elements described with respect to FIGS. 1—4 are shown by primed (') numerals.

As shown, the corner casting 20' is provided with an angled slot 130 formed in the corner casting 20'. The top of the slot 130 is closed off by a cover plate 132 secured to the casting 20' by means of bolts 134. One end 135 of the yoke 24' is of circular configuration and slidably received in a circular opening formed in the casting 20'.

The yoke end 135 is provided with a series of grooves 116' on the upper surface thereof. The rear portions 118' of the grooves 116' are of ramp-shaped configuration. The slot 130 formed in the housing 20' receives a rod 138, the upper end of which protrudes through a hole 140 in the plate 312. The lower end of the rod is provided with a spring retaining element 142.

A coil spring 144 is compressed and retained between the lower side of the plate 132 and the spring retainer 142 formed on the lower end of the rod. Thus, the rod 138 is normally biased in a downward direction.

The bottom end of the rod 138 is provided with a pin 146 which is adapted to engage the grooves 116'. The spring 144 functions to maintain the pin 146 in engagement with one of the grooves 116' to thereby provide a self-locking feature as the yoke 24' is extended by the adjuster mechanism.

In order to retract the yoke 24' the cylinder 44' of the adjuster, which is connected to the yoke 24', is extended an amount sufficient to disengage the pin 146 from one of the grooves 116'. The rod 138 attached to the pin 146 maY then be pulled upwardly overcoming the bias of spring 144 and freeing the pin from the groove. The cylinder 44' and associated yoke 24' may then be retracted as grease is removed from the expansible chamber of the adjusting mechanism.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An elevator assembly comprising a hollow frame member; a movable member slidably received in a first end of the hollow frame member; one end of the movable member extending outwardly of the hollow frame member; cooperating flat guiding surfaces formed on the movable member and hollow frame member; a wheel element rotatably received in the movable member; an endless elevator chain engaged about the wheel element; an adjuster mechanism for selectively extending and retracting the movable member with respect to the hollow frame member to thereby adjust the tension in the chain; adjuster mechanism comprising a hydraulic jack having a rod end, mounting a piston thereon, and a cylinder end; said piston and cylinder cooperating to form a fluidtight expansible chamber; said hydraulic jack having a first end operatively associated with the movable member and a second end operably associated with the hollow frame member; means for introducing a noncompressible fluid under pressure into the expansible chamber to extend the jack and move the movable member and associated wheel element to an adjusted position with respect to the hollow frame member; self-locking mechanical lock means operable to automatically rigidly secure the movable member to the hollow frame member as the jack is extended to prevent the transmission of forces from the frame members to the jack after adjustment has been made.

2. An elevator assembly as set forth in claim 1 wherein the cylinder end of the jack is attached to the movable member and the rod end of the jack is attached to the hollow frame member.

3. An elevator assembly as set forth in claim 2 wherein said piston has seal means mounted thereon for providing a sliding and fluidtight seal between the piston and the internal wall of the cylinder.

4. An elevator assembly as set forth in claim 1 wherein the self-locking mechanical lock means for selectively securing the movable member to the hollow frame member comprises a plurality of grooves formed on the external surface of the movable member; a rotatable pawl rotatably received in the hollow frame member; said pawl having a finger portion for selectively engaging the grooves as the movable member is extended by the adjuster mechanism; and biasing means for normally biasing the finger of the pawl into the grooves formed on the movable member.

5. An elevator assembly as set forth in claim 4 wherein the biasing means comprises a coil spring having a first end attached to the rotatable pawl and a second end attached to the hollow frame member.

6. An elevator assembly as set forth in claim 5 wherein the rotatable pawl is provided with a tang element which extends outside of the hollow frame member whereby a wrench element may be engaged with the tang to overcome the biasing means and remove the finger of the pawl from the grooves so that the movable member may be retracted.

7. An elevator assembly as set forth in claim 1 wherein the self-locking mechanical lock means for releasably securing the movable member to the hollow frame member comprises a plurality of grooves formed on the outer surface of the movable member; slot means formed in the hollow frame member; a rod member received in the slot; a first end of the rod extending outwardly of the hollow frame member; a pin member attached to a second end of the rod member; said pin adapted to be received in the grooves of the movable member; spring biasing means received in said slot about the rod for normally biasing the pin on the end of the rod into the grooves formed on the movable member.

75